United States Patent [19]

Mueller

[11] 4,163,468

[45] Aug. 7, 1979

[54] PIVOTED SUSPENSION FOR LINEAR ACTUATORS OF TIRE CHANGING APPARATUS AND THE LIKE

[75] Inventor: Thomas L. Mueller, St. Louis, Mo.

[73] Assignee: S. W. Malinski, Tamaroa, Ill.

[21] Appl. No.: 848,139

[22] Filed: Nov. 3, 1977

[51] Int. Cl.² ............................................. B60C 25/06
[52] U.S. Cl. .................................................. 157/1.17
[58] Field of Search ....................................... 157/1.17

[56] References Cited

U.S. PATENT DOCUMENTS

| 3,722,570 | 3/1973 | McKenney | 157/1.17 X |
| 4,031,941 | 6/1977 | Malinski et al. | 157/1.17 |
| 4,059,140 | 11/1977 | Sedgwick | 157/1.17 |

Primary Examiner—James G. Smith
Attorney, Agent, or Firm—Jerome A. Gross

[57] ABSTRACT

For thrusting perpendicular to a tire to demount it, or similar purposes, a hydraulic cylinder bearing a thrust shoe is pivotably mounted, by trunnion pins on its casing, to a support frame beneath a slotted platform. A forward arm and follower assembly pivots on the trunnion pins and extends diagonally forward normally to bear on the hydraulic cylinder casing; while a similar aft arm and follower assembly likewise pivots on the trunnion pins, extending aft and normally bearing on the opposite side of the hydraulic cylinder casing. Corresponding portions of these aft and forward assemblies are connected by coil springs; their inward pivotal movement is limited by a stop on the support frame; thus they constantly urge the hydraulic cylinder toward upright position. To correct angular drifting of the actuator rod, its shoe has a downward projecting centering shield having a tapered tip which engages a platform slot when the hydraulic cylinder is retracted, rotating the shoe to its proper position.

5 Claims, 3 Drawing Figures

PIVOTED SUSPENSION FOR LINEAR ACTUATORS OF TIRE CHANGING APPARATUS AND THE LIKE

BACKGROUND OF THE INVENTION

A known tire changer apparatus for removing large tires from drop center wheel rims for tractors and other off-road vehicles utilizes an upright hydraulic cylinder for pushing the tire off the rim after the beads at the side opposite the cylinder are manipulated into the drop center of the wheel rim, as in U.S. Pat. No. 3,612,140.

The portion of the tire casing so pushed does not move directly upward, but in an arc first slightly backwards and then substantially forward. Using a linear actuator fixed in a vertical position, the casing being removed exerts a resisting force on the actuator shoe which has a perpendicular component. Due to dimensional requirements, it is usually necessary to use telescoping hydraulic cylinders for this purpose, which are more easily damaged by perpendicular acting forces than more conventional cylinders.

Since the actuator rod of a hydraulic cylinder is free to rotate, the shoe atop the actuator rod may become angularly displaced, then being in improper position for retraction.

SUMMARY OF THE INVENTION

An object of the present invention is to provide apparatus for supporting a hydraulic cylinder pivotably in upright position and urging it back to such an upright position when, during operation, it has pivoted therefrom. Another object is to rotate a shoe atop the actuator rod of a hydraulic cylinder to proper position for further operation if it should be angularly displaced.

Briefly summarizing, the present invention achieves these purposes and others by use of structure comprising a support frame mounted beneath a slot of a work support platform. The support frame includes a pair of parallel plates on either side of the slot, each having an aligned bore; further, each has an outward projecting stop pin beneath the aligned bore. A hydraulic cylinder is pivotally mounted vertically in the support frame by a pair of outward projecting aligned horizontal trunnion pins through the aligned bores. The cylinder actuator rod extends upward through the slot and ends in a shoe thereabove.

A pair of opposing forward arms are pivotally attached at their upper ends to the trunnion pins and extend downward and forward, ending with a transverse follower rod connecting their lower ends and normally bearing against the cylinder casing. A similar pair of opposing aft arms also pivot about the trunnion pins at their upper ends, but extend downward and aft to another transverse follower rod connecting them, which normally bears against the opposite side of the cylinder casing. In these described positions, the lower edges of the two pairs of arms abut the outward projecting stop pin. A coil spring in tension connects each aft arm with its corresponding forward arm.

When the hydraulic cylinder is tilted from vertical position, one follower rod and its connected arms are displaced from the projecting stop pin by the pivoting on the support frame of the cylinder casing, while the other follower rod and its connected arms remain held against the stop pin. The spring is placed under greater tension, urging the cylinder back to the vertical.

Projecting downward from the shoe atop the actuator rod is a centering shield, having a tapered tip which extends into the slot in the platform when the shoe is in proper position. The shield is of such width as to be snugly accommodated in the slot. If during the work operation the acutator rod should turn to rotate the shoe, the centering shield will cam it to that proper position.

DESCRIPTION OF THE PREFERRED EMBODIMENT

Figure 1:
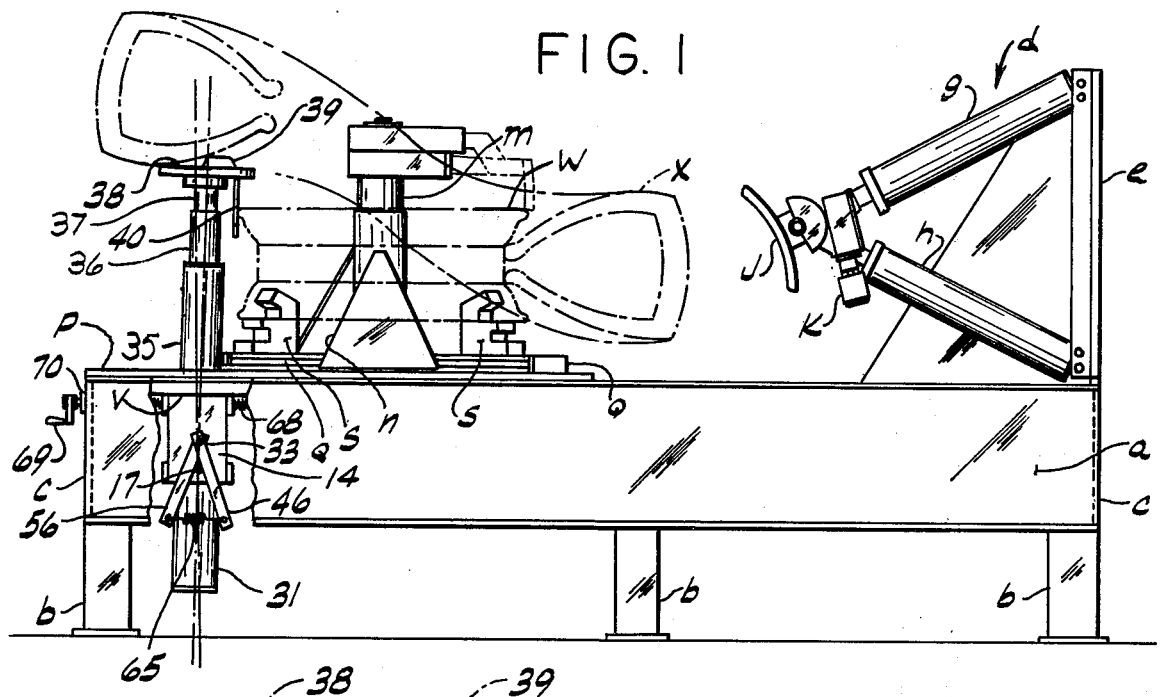
FIG. 1 is a left elevation of the tire changer apparatus, showing a drop center wheel rim and its tire casing in phantom lines. The hydraulic cylinder is shown extended pushing the tire from the rim.

U.S. Pat. No. 4,031,941 shows tire changing apparatus of the type for which the present invention is particularly adapted. Such apparatus, shown in FIG. 1, has two deep parallel longitudinal I-beams a supported at their ends by legs b. At its ends, transverse webs c are also provided. At the forward or right end of the embodiment, as shown in FIG. 1, is attached a hydraulic thrust-applying mechanism, generally designated d, which has a reaction resisting structure e attached to the I-beams a. Upper and lower hydraulic cylinders g, h, triangulated to exert the thrust at a common transverse axis, are attached to the reaction resisting structure e in a central vertical plane. A thrust-applying shoe j projects from the common transverse axis of the upper and lower hydraulic cylinder g, h and is adjusted pivotably about that axis by a hydraulic motor k. Thus it can exert its thrust in line with either cylinder g, h or at an intermediate angle.

Midway along the parallel longitudinal I-beams a and centrally located between them is a support tube m, strengthened by diagonal gusset plates n to a work support platform p. Within and upward from the support tube m is normally contained a counter-rotating mechanism used for mounting tires, which is not shown or described in detail in this embodiment, since the present invention only deals with demounting tires. Also extending outward from the support tube m on the platform p are four diagonally extending chuck tracks q. Each chuck track q has a clamp shoe s which may be adjusted inward and outward.

For mounting a tire, as described in U.S. Pat. No. 4,031,941, bead deflectors shown in phantom lines in FIG. 1, mounted on arms extending from concentric, contra-rotating tubular shafts through the support tube m, contra-rotate about a rim through substantially semi-circular arcs starting adjacent to a point at which thrust is so exerted on a tire casing, to seat the beads of the casing; such deflectors conveniently are removed when a tire is to be demounted.

Extending from the aft end of the work platform p is a central slot u, its length extending parallel to the I-beams a. Beneath the work platform p and along both sides of the central slot u are angled ways v, extending downward and inward.

Figure 2:
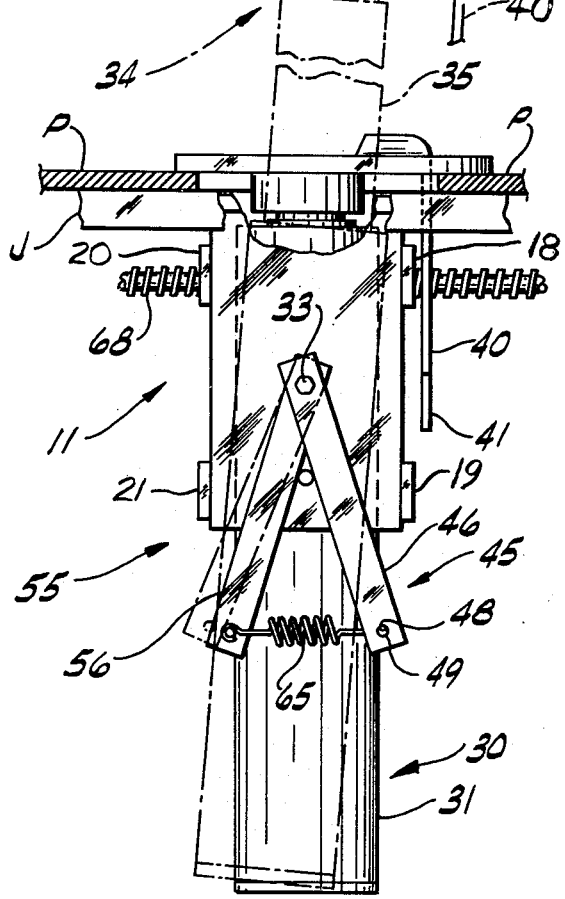
FIG. 2 is a left elevation fragmentary view of the pivoting linear actuator mechanism. The mechanism is shown tilted in phantom lines.
Figure 3:
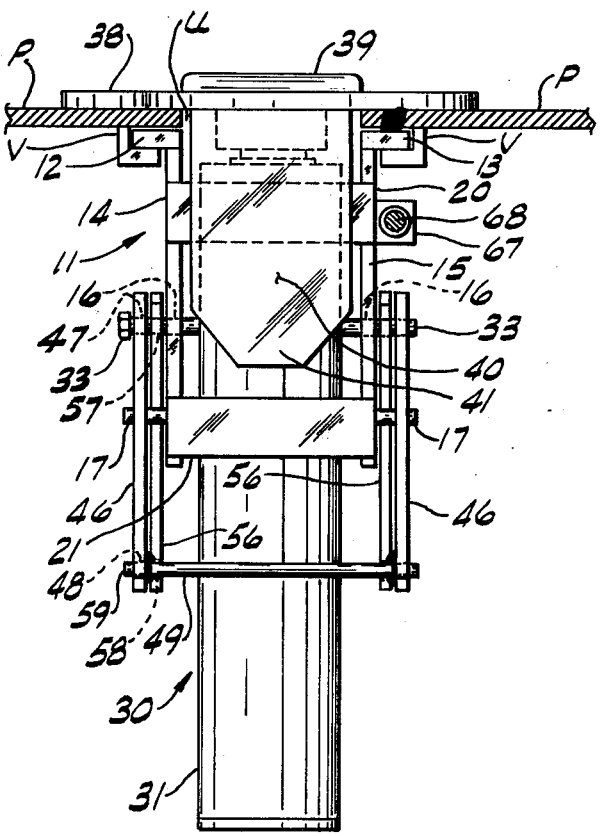
FIG. 3 is a forward elevation view of the pivoting linear actuator mechanism.

In the illustrated embodiment, beneath the work platform p is a support frame, generally designated 11, most clearly shown in FIGS. 2 and 3. Suspended by left and right support flanges 12, 13, fitted slidably within the ways v, the frame 11 is made up principally of a left suspension plate 14 and a parallel right suspension plate 15 welded to the respective flanges. The parallel suspension plates 14, 15 have horizontal aligned bores 16 and outward projecting stops 17 therebeneath, formed by pins welded to the outer sides of plates 14, 15. The support frame 11 is completed by upper and lower forward tie plates 18, 19, connecting the left and right suspension plates 14, 15 and by upper and lower aft tie plates 20, 21 attaching the left and right parallel suspension plates 14, 15 at their opposite ends. The attachment of the tie plates 18, 19, 20, 21 and support flanges 12, 13 to the suspension plates may be by welding.

A linear actuator, in this case a telescoping hydraulic cylinder, generally designated 30, is positioned within the support frame 11. The telescoping hydraulic cylinder 30 has a casing 31 having conventional hydraulic hose connections, not shown, and having a pair of outward projecting opposed aligned horizontal trunnion pins 33 spaced between the ends of the casing 31. The hydraulic cylinder 30 is of the type which has its actuator rod provision 34 formed in three telescoping sections; a first or outer section 35, a second intermediate section 36, and a third inner section or rod 37. Extending from the third section 37 and attached thereto is a thrust shoe 38, whose forward edge is curved to fit immediately adjacent to a rim held in the clamp shoes s, and which has an upward projecting hump 39. Welded near the forward edge of the thrust shoe 38 and projecting downward therefrom, spaced offset from the cylinder casing 31, is a centering shield 40, constructed of flat plate. The centering shield 40, of such width as to be accommodated perpendicularly centered within the central slot u in the work platform p, has a tapered lower tip 41.

The telescoping hydraulic cylinder 30 is pivotably mounted to the support frame 11, its trunnion pins 33 projecting through the aligned bores 16 of the parallel suspension plates 14, 15. The actuator rod 34 extends upward through the central slot u of the work platform p with the thrust shoe 38 lying above the work platform p.

A forward follower assembly, generally designated 45, has a pair of forward arms, each designated 46. Each forward arm 46 has at its upper end, an upper bore 47 by which the forward arm 46 is pivotally attached to the trunnion pin 33 of the hydraulic cylinder 30 outward of the support frame 11. Each forward arm 46 further has a lower bore 48 at its lower end which accommodates a forward transverse follower rod 49 connecting the forward arms 46. Normally each forward arm 46 extends diagonally downward and forward from its pivot on the trunnion pin 33, at such angle that the forward transverse follower rod 49 abuts against the casing 31 of the hydraulic cylinder 30, and the lower edge of the forward arm 46 abuts against the outward projecting stop 17 mounted on the parallel suspension plates 14, 15.

A similar aft follower assembly, generally designated 55, has a pair of aft arms, each designated 56, each having an upper bore 57 and a lower bore 58. Again, each aft arm 56 pivots, by its upper bore 57, about a trunnion pin 33 and is connected to the other aft arm 56 by an aft transverse follower rod 59 through the lower bore 58. The aft arms 56 extend downward and aft from the trunnion pins 33, at such angle that the aft transverse follower rod 59 normally abuts against the telescoping cylinder 30, and the lower edge of the aft arm 56 abuts the opposite side of the outward projecting stop 17 of the parallel suspension plate 14, 15, similarly to the forward follower assembly 45.

Outward of the casing 31, a pair of tension coil springs, each designated 65, connect the aft transverse follower rod 59 to the forward transverse follower rod 49 at their junctures with the pairs of forward and aft arms 46, 56.

Alongside the upper part of the support frame 11, adjacent to the right parallel suspension plate 15, is a horizontal threaded block 67, which accepts a threaded shaft 68. The threaded shaft 68 extends rearward to outward of the rearmost transverse web c, aft of which it terminates in a crank 69, being supported at the web c by a bushing 70.

In general operation of the present above described mechanism, a drop center wheel rim w with an accompanying tire casing x is positioned over the support tube m, the rim w being held in place by four clamp shoes s. Then, to remove the tire, the hydraulic thrust supplying mechanism d with its thrust-applying shoe j is so manipulated by the hydraulic cylinders g, h to press the beads of the tire casing x into the drop center of the rim w at a point opposite to the telescoping cylinder 30.

The telescoping hydraulic cylinder 30 is positioned by the crank 69 and threaded shaft-block 67, 68 so that its shoe 38 is closely adjacent to the wheel rim w. The cylinder 30 is extended so that the thrust shoe 38 drives upward against the lower side wall of the tire casing x. As the tire x is pushed upward, the portion of the casing on the shoe 38 is drawn somewhat aft by the resistance offered by the upper flange of the rim, and with progressive lifting relative to that flange, it finally swings somewhat forward of it, as shown in FIG. 1. This movement of the tire x relative to the rim w is followed by the thrust shoe 38 of the pivotable telescoping cylinder 30, which pivots about its trunnion pins 33 subject only to the resistance of the springs 65 acting on the follower assemblies 45, 55, as hereafter described.

After the tire x is removed for the rim w and it is desired to retract the hydraulic cylinder 30, it is desirable that the telescoping cylinder be returned to vertical position, and the thrust shoe be retracted, without danger of either the shoe 38 hanging up on the rim w or the actuator rod 34 striking the rim w and being damaged. The forward follower assembly 45, aft follower assembly 55 and the tension coil springs 65 together serve to return the cylinder to its vertical position clear of the wheel rim w. As the hydraulic cylinder 30 is tilted toward the rim w, as shown in FIG. 2, the aft follower arm 56 and aft transverse follower rod 59 pivot outward from the stops 17, along with the portion of the telescoping cylinder 30 below the trunnion pin 33, against increasing tension in the coil springs 65. The forward follower assembly 45 remains stationary since the lower edges of the forward arms 46 are abutting the outward projecting stops 17.

On the upward stroke of the cylinder 30, the mechanism described yields to allow slight aft pivoting followed by more substantial forward pivoting. Thus, on the initial portion of the upstroke, aft pivoting is accommodated by pivoting of the forward follower assembly 45 away from the stops 17, while the aft follower assembly 55 remains against the stops 17. The continuing accommodation to pivoting movements will be obvious.

As the actuator rod 34 of the hydraulic cylinder 30 is extended to demount the tire x, the thrust shoe 38 may rotate slightly from its original position, since the actuator rod 34 is free to turn within the telescoping hydraulic cylinder 30. The thrust shoe 38 must not be so angularly displaced when the actuator rod is retracted, since the thrust shoe 38 will then not be in proper position for demounting another tire. The thrust shoe 38 will, however, be restored angularly to its undisplaced position as it is retracted, by camming of the tapered tip 41 of the centering shield 40 as it moves downward into the central slot u of the work platform p.

Detailed mechanical changes may be made; for example, each of the forward and aft follower assemblies may be made integral. Other modifications in construction and utilization will from this disclosure be apparent to persons skilled in the art.

I claim:

1. In a tire changer having a horizontal work support provision and a linear actuator having its casing supported by a support frame beneath the level of the actuator pivotally in the support frame and for urging it to a substantially vertical position, the improvement comprising
   - opposed horizontal trunnion means to suspend said actuator in said support frame for pivoting.
   - forward arm and follower means to pivot outward relative to said support frame in a forward direction on corresponding movement of said casing,
   - aft arm and follower means to pivot outward relative to said support frame in an aft direction on corresponding movement of said casing,
   - stop means for said forward and aft arm and follower means, fixedly associated with said support frame, to limit aft pivoting of said forward arm and follower means and to limit forward pivoting of said aft arm and follower means, and
   - spring means, operably associated with said forward arm and follower means and with said aft arm and follower means, to urge each said arm and follower means against said stop means,
   - whereby by said spring means the pivoting freedom of said linear actuator is restrained and on pivoting it is urged to a substantially vertical position.

2. In a tire changer for mounting and demounting a pneumatic tire on a drop center wheel rim, such changer being of the type supported by a base structure and having a work support provision to which such wheel rim may be secured horizontally, a support frame beneath the level of the work support provision, and a linear actuator having an elongated casing and an actuator rod terminating in a thrust shoe, the improvement comprising
   - opposed horizontal trunnion pin means to pivotally suspend said actuator within said support frame, with its rod projecting upward and its thrust shoe directly beneath such tire on such secured rim,
   - forward arm and follower means to pivot relative to said support frame outward in a forward direction on corresponding movement of such casing,
   - aft arm and follower means to pivot relative to said support frame outward in an aft direction on corresponding movement of said casing,
   - stop means for said forward and aft arm and follower means, fixedly associated with said support frame, to limit aft pivoting of said forward arm and follower means and to limit forward pivoting of said aft arm and follower means, and
   - spring means, operably associated with said forward arm and follower means and said aft arm and follower means, to urge each said arm and follower means against said stop means,
   - whereby when the beads of such tire are within the drop center of such wheel rim at a point horizontally opposite to said linear actuator, such tire may be pushed from such wheel rim by said linear actuator, said actuator pivoting about said trunnion pin means to depart from vertical and to follow the movement of such tire when so pushed and when retracted, being urged by one or the other of said arm and follower means to substantially vertical position.

3. The improvement defined in claim 2, characterized in that said linear actuator is a hydraulic cylinder, and in that the work support provision has a slot through which the hydraulic cylinder projects upward to and terminates in a thrust shoe, and further comprising
   - a centering shield projecting downward from said thrust shoe and spaced offset from said hydraulic cylinder and being of such width to be accommodated by said slot, and having a tapered lower tip,
   - whereby, if said thrust shoe should rotate and be angularly displaced when said hydraulic cylinder is extended upward, said shoe will be restored to its undisplaced angular position by camming of said tapered tip of said centering shield when said hydraulic cylinder is retracted and said centering shield projects downward into said slot.

4. In tire changer apparatus of the type utilizing a linear actuator having an elongated casing, an upward projecting actuator rod, and a shoe at the upper end of the actuator rod,
   the improvement comprising pivoting suspension mechanism including
   A. a support frame including a pair of parallel plate suspension means having
      - a pair of aligned bores, and
      - a pair of outward projecting stop means therebeneath,
   B. a pair of outward projecting opposed aligned horizontal trunnion pins fixed to said linear actuator casing, spaced between the casing ends and engaged through said aligned bores of said pair of parallel plate suspension means, by which said elongated casing is suspended normally in upright position,
   C. an aft follower assembly comprising
      - a pair of opposed aft arms pivotably attached at their upper ends to said trunnion pins outward of said support frame, and extending diagonally downward and aft therefrom and having edge portions normally bearing against said stop means, and
      - a transverse follower rod connecting said pair of opposed arms and normally bearing against said casing,
   D. a forward follower assembly comprising
      - a pair of similar opposed forward arms pivotably attached at their upper ends to said trunnion pins outward of said support frame, and extending diagonally downward and forward therefrom, and having edge portions normally bearing against said stop means, and
      - a transverse follower rod connecting said pair of opposed arms and normally bearing against said casing, and E. tension spring means connecting said aft follower assembly to the corresponding said forward assembly, whereby, when the actuator is tilted, it draws one of said follower arm assemblies from said stop means and said spring means urges the assembly so drawn to restore the actuator to such upright position.

5. The improvement as defined in claim 4, characterized in that said linear actuator is a hydraulic cylinder, further comprising a support platform having a slot beneath which said support frame is mounted, the plates of said parallel plate suspension means being positioned along the sides of said slot, whereby said upward projecting actuator rod may project upward through said slot to said shoe at its upper end above said platform, said mechanism being further characterized in that said shoe has, projecting downward therefrom, and spaced offset from the casing of said hydraulic cylinder, a centering shield, normally being perpendicular to and centered inwardly of said slot, said shield having a tapered lower tip, whereby, if said shoe should rotate and be angularly displaced when said hydraulic cylinder is extended, said shoe will be restored to its undisplaced angular position by camming of the tapered tip of said shield on entering downward into said slot.

* * * * *